United States Patent
Bjorkholm et al.

[11] 3,786,368
[45] Jan. 15, 1974

[54] PLANAR WAVEGUIDE-TYPE DISTRIBUTED FEEDBACK LASER WITH ANGULAR TUNING

[75] Inventors: John Ernst Bjorkholm; Charles Vernon Shank, both of Holmdel; Thomas Patrick Sosnowski, Colts Neck, all of N.J.

[73] Assignee: Bell Telephone Laboratories, Incorporated, Murray Hill, N.J.

[22] Filed: Oct. 20, 1972

[21] Appl. No.: 299,257

[52] U.S. Cl. .......................... 331/94.5, 350/96 WG
[51] Int. Cl. ............................................... H01s 3/00
[58] Field of Search ............... 331/94.5; 350/96 WG

[56] References Cited
OTHER PUBLICATIONS

Bjorkholm et al., Higher Order Distributed Feedback Oscillators. Appl. Phys. Lett., Vol. 20, No. 8, (April 15, 1972) pp. 306–308.
Wang et al., Thin–Film Optical–Waveguide Mode Converters Using Gyrotropic and Anisotropic Substrates. Appl. Phys. Lett., Vol. 19, No. 6, (Sept 15, 1971) pp. 187–189.
Kogelnik et al., Coupled–Wave Theory of Distributed Feedback Lasers. J. Appl. Phys., Vol. 43. No. 5, (May 1972) pp. 2,327–2,335.

*Primary Examiner*—William L. Sikes
*Attorney*—W. L. Keefauver et al.

[57] ABSTRACT

There is disclosed a distributed feedback laser made in an active thin film optical waveguide deposited on an anisotropic substrate of which the ordinary and extraordinary indices are lower than the film index. The laser is tunable by changing the direction of the pumping fringes or other spaced perturbations that produce the distributed feedback scattering with respect to the substrate optic axis. The change in direction of the pumping fringes or effective perturbation also changes the direction of propagation of laser light relative to the substrate optic axis and changes the optical fringe spacing without changing the free-space fringe spacing. Narrow-line single-mode tunable oscillation has been obtained.

5 Claims, 3 Drawing Figures

PLANAR WAVEGUIDE-TYPE DISTRIBUTED FEEDBACK LASER WITH ANGULAR TUNING

BACKGROUND OF THE INVENTION

This invention relates to the type of laser commonly known as a distributed feedback laser or integrated feedback laser.

Distributed feedback lasers are described, for example, in the article "Tunable Distributed-Feedback Dye Laser" by C. V. Shank et al., *Applied Physics Letters*, Vol. 18, page 395 (1971). A further description is found in the article "Higher-Order Distributed Feedback Oscillators" by J. E. Bjorkholm et al., *Applied Physics Letters*, Vol. 20, page 306 (1972). In a distributed feedback laser, the feedback necessary for oscillation is provided by a periodic structure which affects the propagation of light through the active medium. Such a structure may be distributed, for example, throughout an active medium, although it could also be adjacent the medium, and takes the form of a spatial modulation of the index of refraction of the laser medium, or its effective light propagation properties or its gain. The feedback mechanism is backward Bragg scattering off this periodic modulation. Because Bragg scattering is highly frequency selective, narrow oscillation linewidths result. The lasing wavelength is approximately equal to twice the optical length of the period of the modulation. If the modulation period can be conveniently changed, then tuning is readily accomplished.

One of the more versatile forms of the distributed feedback laser provides two interfering coherent light beams incident at an angle with respect to each other on the active medium to form the pumping fringes. A change of the relative angle will change the fringe spacing.

Nevertheless, such an adjustment of the spacing is somewhat erratic and cannot be precisely controlled because the fringe spacing tends to change rapidly with the change in relative angle. The fringe spacing is also subject to disturbances of any of the optical components employed. These disturbances can be minimized if the angle is kept fixed.

It is therefore an object of this invention to provide an alternative tuning mechanism for the distributed feedback laser.

SUMMARY OF THE INVENTION

According to our invention, angular tuning has been achieved in a distributed feedback laser constructed in a thin film optical waveguide arrangement in which the thin film is deposited on an anisotropic substrate of which the ordinary and extraordinary indices are lower than the film index. The angular tuning is achieved by a change in the direction of laser oscillation in the thin film with respect to the projection of the substrate optic axis upon the interface of the film in the substrate.

In a first specific embodiment, the change in the direction of laser oscillation is achieved by a change in the direction of pumping light fringes with respect to the direction of the aforesaid projection of the substrate optic axis. This change is achieved typically by rotating the optical waveguide device and the projection of the substrate optic axis relative to the interfering pump beams that form the fringes.

In a second specific embodiment, evenly spaced perturbations are provided in the optical waveguide device with circular symmetry about an axis orthogonal to the interface of the film and the substrate. Again, the substrate optic axis has a projection upon that interface that is rotated with respect to the effective direction of pumping when the device is rotated about the axis of symmetry. In this case the effective direction of pumping is defined by supplying the pumping light in a markedly elongated pumping area extending from edge to edge of the device through the axis of symmetry. This pumping area will hereinafter be referred to as the pumping line, with reference to its elongation. In this sense, the pumping line has nothing to do with the pump frequency. The evenly spaced perturbations can be variations in thickness, index or gain of the optical waveguide device, and can occur either in the film or in the portion of the substrate adjacent to the film.

With either embodiment, stable variation of the wavelength of the distributed feedback laser may be achieved.

BRIEF DESCRIPTION OF THE DRAWING

Further features and advantages of our invention will become apparent from the following detailed description taken together with the drawing, in which.

DESCRIPTION OF ILLUSTRATIVE EMBODIMENTS

Figure 1:
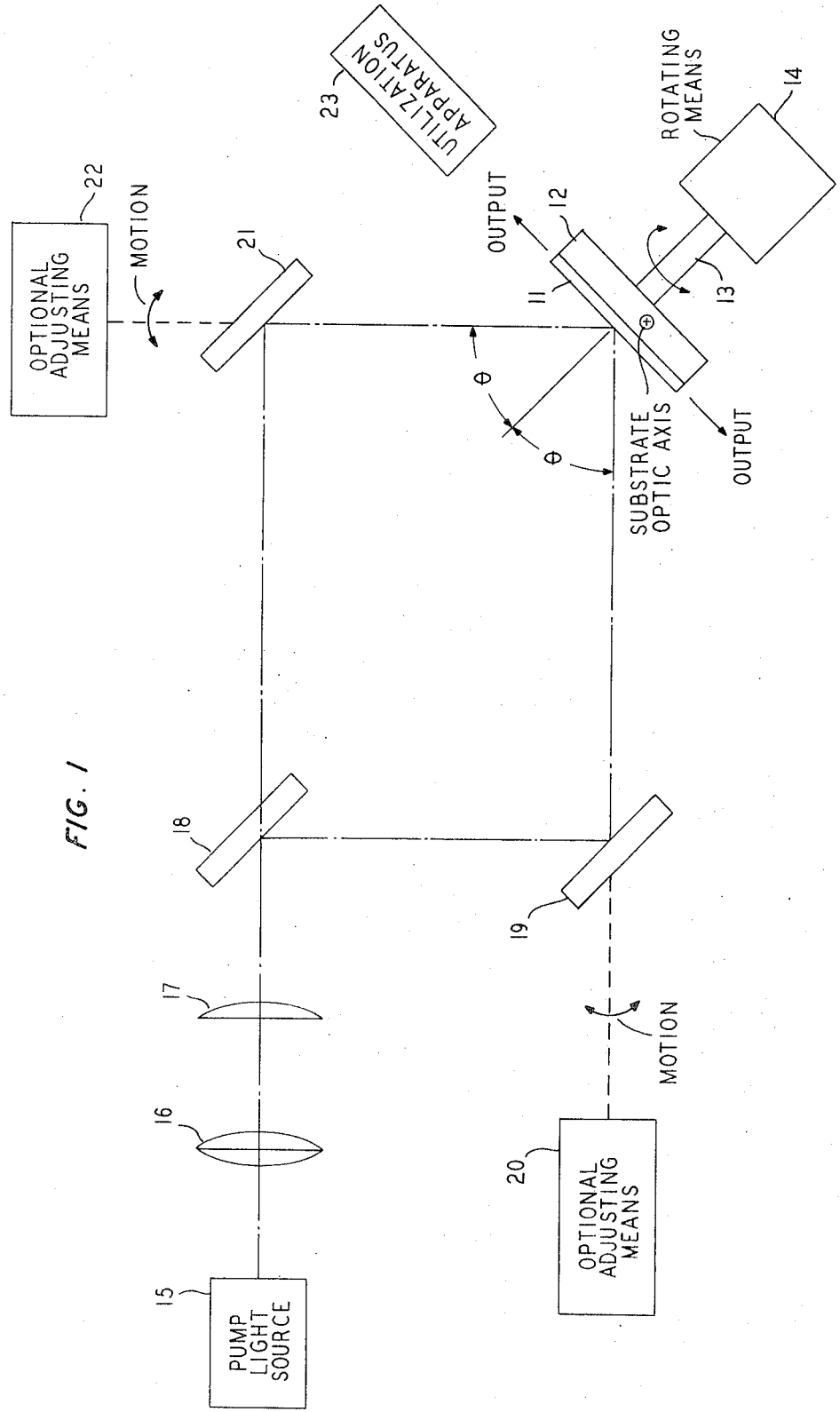
FIG. 1 is a partially pictorial and partially block diagrammatic illustration of a preferred embodiment of our invention.

In the embodiment of FIG. 1, it is desired to obtain a precisely tunable narrowband laser oscillation from a thin film optical waveguide device including the thin film 11 and the substrate 12 on which the thin film 11 is deposited. The substrate 12 is characteristically an anisotropic crystal in which the substrate optic axis has a projection upon the interface of the film 11 and the substrate 12. In other words, the substrate optic axis is nonorthogonal to the interface.

Tuning is illustratively achieved in the embodiment of FIG. 1 by rotation of the just described optical waveguide device by a rotating means 14 which rotates a rotatable mounting means 13 attached to substrate 12.

In order that the rotation not result in loss from the optical waveguide device, the index of the film 11 is higher than both the ordinary index of refraction, $n_o$, of the substrate 12 and the extraordinary index of refraction, $n_e$, of substrate 12. In other words, the film index $$n_f > n_o, n_e .$$

(1)

Illustratively, the thin film 11 is polyurethane doped with rhodamine 6G; and the substrate 12 is a crystal of ammonium dihydrogen phosphate (ADP) having a polished surface at its interface with film 11. The refractive index, $n_f$, of thin film 11 is 1.552.

The active medium in thin film 11 is illustratively pumped by optical interference fringes produced by two coherent optical beams derived from the single coherent pump laser source 15. Source 15 is illustratively a higher frequency laser than that which is to be tuned in the rotatable device. The interfering beams are formed by focusing the single beam from source 15 through spherical lens 16 and cylindrical lens 17, splitting that beam at beamsplitter 18 and redirecting the split components from the adjustable reflectors 19 and 21 at a fixed angle 20 relative to each other. The relative path lengths can be altered as an initial or optional adjustment. To the latter end, the optional adjusting means 20 and 22 are shown for the purposes of providing the appropriate mechanical motion of reflectors 19 and 21. While this motion is not purely translational, the degree of rotation required for any specific translation can be calculated from well-known formulas; and indeed, cams can be devised to coordinate the translation and rotation.

It should be understood that one of the primary advantages of the present invention as applied to a pumping fringe type of distributed feedback laser is the minimizing or eliminating of the need for such optional adjustment of reflectors 19 and 20. For the purpose of our consideration hereinafter, the angle 20 shall be assumed to be constant.

Since the plane defined by the respective axes of the two interfering pump beams is stationary in spacing, the output beam from thin film 11 will remain in that plane despite the rotation of thin film 11 and substrate 12. The utilization apparatus 23 is disposed to receive the output laser radiation in that plane in whatever direction it is coupled from thin film 11. For ease of illustration, it is assumed that the output is coupled through the edge of thin film 11 in FIG. 1; but other means of output coupling are well known.

The pump light source 15 was illustratively a single mode ruby laser including a frequency doubler so that the output beam was provided at a wavelength of 0.347 micrometers. Frequency doubling was accomplished in a crystal of potassium dihydrogen phosphate (KDP). The dimensions of the long, narrow pumped region in thin film 11 were approximately 1 centimeter long by 0.3 millimeters wide. Lasing occurs along the long dimension, which is also the direction of the fringe spacing.

In our initial experiments, only a small fraction of the pump light was absorbed in passing through the thin film 11, so that the pumping was essentially uniform along a direction normal to the plane of the film. The output light of the waveguide laser was collected by a lens (not shown) and focused onto the entrance slit of a spectrograph, which served as utilization apparatus 23. This method of output coupling was chosen for our experiments since the output beam was free of angular dispersion which would complicate coupling of the light into the spectrograph. Polarizing filters (not shown) were used to study the polarization properties of the output and thus to determine the frequencies of the TE and TM waves for each tuning condition.

For purposes of reference, let us designate the thickness of thin film 11 to be W, illustratively 0.77 micrometers, and the fringe spacing $\Lambda$ to be 0.1945 micrometers. For KDP the highest substrate index is $n_o = 1.524$ and the lowest substrate index, $n_3 = 1.479$. We further assume that the medium overlying film 11 is air.

In a typical operation of the device of FIG. 1, the peak power output of the ruby laser in source 15 was about 1 megawatt; and the maximum second harmonic power output from the KDP crystal in source 15 was approximately 250 kilowatts.

The particular film thickness W selected provides a single mode optical waveguide. The spectrum of the distributed feedback laser of FIG. 1 consists of two frequencies only, one for the $TE_o$ mode and one for the $TM_o$ mode. Distributed feedback scattering and laser oscillation occurs near the Bragg condition; that is, when the wavelength in the medium is equal to $2\Lambda$. The Bragg condition can be written as $$\lambda = 2\Lambda\, n_{eff}(\lambda) \tag{2}$$

where $\lambda$ is the oscillation wavelength in air and $n_{eff}(\lambda)$ is a function that depends upon the guide parameters and upon which mode is being considered. In addition, $n_{eff}$ also depends upon the angle $\phi$, which is the angle between the direction of laser oscillation in film 11 and the projection of the substrate optic axis upon the interface of film 11 and substrate 12. The angle $\phi$ lies in the plane of film 11 and cannot be seen in FIG. 1. Thus by changing $\phi$ we can change $\lambda$, i.e., achieve tuning.

Figure 2:
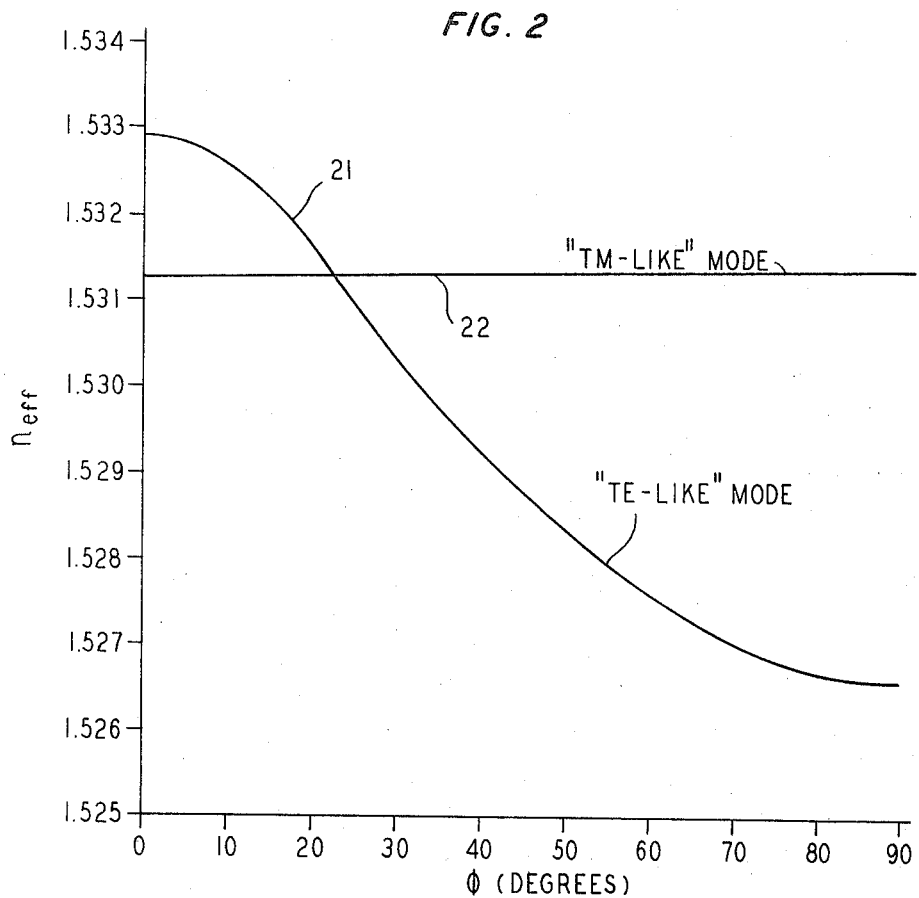
FIG. 2 shows illustrative tuning curves for the embodiments of FIGS. 1 and 3.

The tuning characteristic for a typical TE mode, for example, the $TE_o$ mode, is shown by curve 21 of FIG. 2. For a given angle $\phi$, which is determined by the rotation, a value of $n_{eff}$ results as shown on the curve, and the oscillation wavelength is determined by Eq. (2) where $n_{eff}$ is now a given number. Correspondingly, the tuning of the TM mode, for example, the $TM_o$ mode, is given by curve 22 of FIG. 2 which again gives a value of $n_{eff}$ where a given angle $\phi$ is determined by the rotation of the device. It will be seen that the TM mode experiences much less tuning than that of the TE mode.

It is clear that as various guide parameters, such as $W$, $n_f$, $n_e$, $n_o$, or $\Lambda$ change, the dispersion curves of FIG. 2 and the operating wavelength determined from Eq. (2) would also change. For the specific embodiment of FIG. 1, the perturbation spacing $\Lambda$ is the fringe spacing and is given by $$\Lambda = \lambda_p/2\sin\theta, \tag{3}$$

where $\lambda_p$ is the pump wavelength and $\theta$ is the angle between the normal to the film 11 and one of the interfering pump beams.

Alternatively, the necessary perturbations for distributed feedback can be provided by means other than pump beam interference fringes, since variation of the parameter $\Lambda$ is not necessary to the tuning of the laser of our invention.

Figure 3:
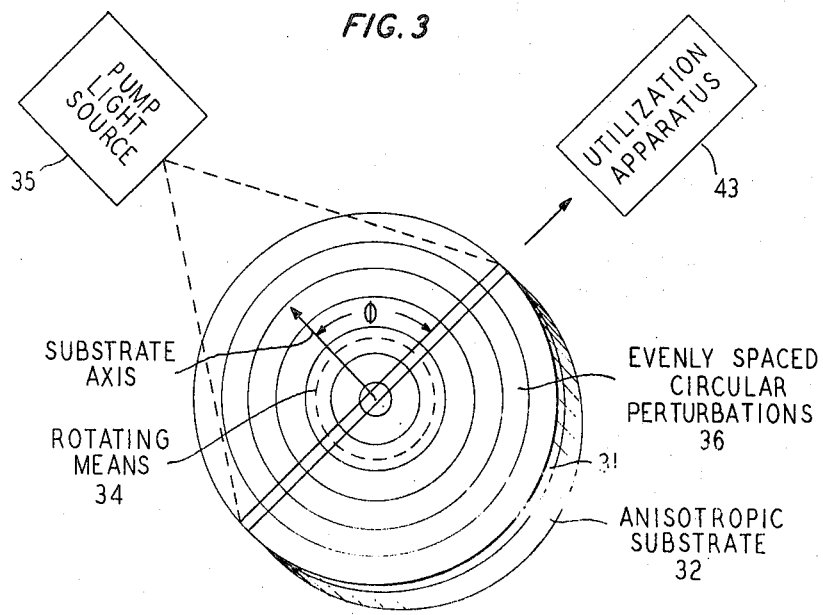
FIG. 3 shows another embodiment of the invention in which stable circular perturbations in the optical waveguide device provide the distributed feedback.

For example, in the embodiment of FIG. 3 the optical waveguide device includes a circularly symmetrical thin film 31 disposed on an anisotropic substrate 32, the combined device being provided with evenly spaced circular perturbations 36 that are symmetrical about an axis of symmetry of film 31 and substrate 32. The evenly spaced perturbations can be periodic variations in thickness, index of refraction, or gain of thin film 31 or the portion of substrate 32 adjacent to thin film 31. Again, the substrate optic axis is nonorthogonal to the interface of film 31 and substrate 32 and thus is not parallel to the axis of symmetry.

In this circularly symmetrical device the direction of lasing is determined by a pumping light line supplied from a laser source 35 and extending from edge to edge of thin film 31 through the axis of symmetry. Utilization apparatus 43 is aligned with the end of this pumping line. Tuning is achieved as the substrate optic axis, or specifically its projection upon the interface of film 31 and substrate 32 is rotated by a rotating means 34 with respect to the pumping line. The angle $\phi$ is thus varied. If the film and substrate are of the same composition, thickness and orientation, respectively, as in FIG. 1, the tuning characteristics will be the same as shown in FIG. 2.

Rotation of the device is provided by the rotating means 34 disposed under substrate 32 in essentially the same manner as shown in FIG. 1. The axis of rotation is the axis of symmetry of the circularly symmetrical device of FIG. 2.

One substantial additional use of our invention other than simply providing a tunable oscillation is the measurement of the parameters of unknown thin films or of optical thin films during a manufacturing process. For instance, if the refractive indices of the substrate and overlying medium are known for a single mode guide, then the oscillation wavelengths of the $TE_o$ and $TM_o$ modes specify the thin film index $n_f$ and its thickness W. If $n_f$ is known in advance, then a measurement of either the $TE_o$ or $TM_o$ wavelengths specifies W. At present, such measurements of optical thin films are made by using the prism-coupler technique, now well known in the art. Our technique of measuring the parameters of such thin films provides significant advantages. For example, the distributed feedback technique is well suited for the routine rapid processing of a large number of thin films or waveguides, as would occur in a manufacturing process.

As an example of how the two measurement techniques are carried out, let us consider the problem of measuring $n_f$ and W for a single-mode guide for which the refractive indices of the substrate and superstrate are both known. For the moment, let us assume that the substrate is isotropic, to simplify the discussion. The parameters $n_f$ and W can be calculated from the equations describing the dispersion of a thin film guide if measurements of $n_{eff}$ for either the $TE_o$ or the $TM_p$ modes are made at two different wavelengths or if the values of $n_{eff}$ for the $TE_o$ mode and the $TM_o$ mode are measured at the same or different wavelengths.

Thus, using the prism-coupler technique the measurement is carried out by accurately measuring the angles at which light of a given frequency is optimally coupled into the $TE_o$ mode and the $TM_o$ mode of the guide. If $n_{pr}$ is the refractive index of the prism and $\theta_{pr}$ is the internal angle of incidence at the base of the prism for optimum coupling, then we have $$n_{eff} = n_{pr}\sin\theta_{pr} .$$

(4)

The easiest technique to measure $n_{eff}$ using our distributed feedback is to pump an active thin film guide with fringes having an accurately known value of $\Lambda$ and to measure the resulting wavelength of the $TE_o$ mode and of the $TM_o$ mode. For our particular setup, Eq. (3) yields $$n_{eff} = (\lambda/\lambda_p) \sin\theta,$$

(5)

where it is necessary that $\sin\theta$ be accurately known. A conventional angle measurement could be utilized to determine $\theta$. However, $\sin\theta$ may be more conveniently determined to the desired accuracy by measuring the wavelength of oscillation in an organic dye solution having an accurately known index-of-refraction and pumped with the same experimental setup.

Advantages of the distributed feedback technique over the prism-coupler technique are as follows. First, no contact is made to the guide being measured. Physical distortion of the guide is possible using a prism coupler; and the degree of coupling affects the propagation characteristics of the film. Secondly, it is more convenient to make measurements of wavelengths to the desired accuracy. Thirdly, the manipulation required in the prism-coupler technique has been done away with. Finally, all the data needed to determine $n_f$ and W can be obtained in a single shot. The distributed feedback method is very rapid once the apparatus is set up and the angle $\theta$ accurately measured. The major disadvantage is that as outlined above it is useful only with active optical waveguides. It is hoped that the technique can also be used with passive guides by the technique of evanescent field coupling to adjacent active medium.

For an anisotropic substrate, a single-mode film is the simplest case. The plane defined by the intersecting axes of the interfering pump beams would be oriented at 0° or 90° with respect to the substrate optic axis. The values for $n_{eff}$ for each mode, $TM_o$ and $TE_o$, are then those at the appropriate extremities of curves 21 and 22 of FIG. 2.

In all cases it is to be understood that the abovedescribed arrangements are merely illustrative of a small number of the many possible applications of the principles of the invention. Numerous and varied other arrangements in accordance with these principles may readily be devised by those skilled in the art without departing from the spirit and scope of the invention.

We claim:

1. A laser comprising an anisotropic substrate having an optic axis non-orthogonal to a major surface thereof, a waveguiding film adjoining said major surface and having an index of refraction higher than both indices of refraction of said substrate, one of said film and substrate including an active medium, and means for pumping said medium to establish a population inversion between energy levels in said medium with optical radiation in a directionally-oriented pattern determining an effective direction of distributed feedback scattering, said pattern of pumping radiation and the combination of said substrate and said films together providing periodic optical perturbations to yield the distributed feedback scattering, said laser including means for tuning its frequency of oscillation by changing the angle $\phi$ between the effective direction of feedback scattering and the projection of said optic axis on said major surface.

2. A laser according to claim 1 in which the means for pumping the medium includes means for supplying to said medium two coherent interfering pumping beams yielding interference fringes that yield along their minimum spacing distributed feedback scattering and in which the means for tuning by changing the angle $\phi$ comprise means for changing the orientation of the fringes with respect to the projection of the substrate optic axis, comprising means for rotating the waveguiding film in a plane effective to change said angle $\phi$.

3. A laser according to claim 1 in which the combination of the anisotropic substrate and the waveguiding film has an axis of substantially circular symmetry and includes evenly spaced perturbations in material properties of said combination, said perturbations being circularly symmetrical about said axis of symmetry, and the means for pumping the medium comprises means for supplying to said combination coherent pumping light in an elongated continous pattern illuminating an elongated region extending through the axis of symmetry between opposite edges of the film, the means for tuning the frequency by changing the angle $\phi$ comprising means for rotating the combination with respect to the elongated region.

4. A laser according to claim 3 in which the rotating means rotates the combination about the axis of symmetry.

5. An optical thin film waveguide device comprising an anisotropic substrate having an optic axis substantially parallel a major surface thereof, a waveguiding film adjoining said major surface and having an index-of-refraction higher than both indices of refraction of the substrate, one of said film and substrate including an active medium, and means for pumping said medium with optical radiation interference fringes, said optical thin film waveguide device including means for tuning its frequency of oscillation in that said pumping means includes means for changing the orientation of the fringes with respect to said optic axis.

* * * * *